(12) United States Patent
Beekmann (10) Patent No.: US 10,270,287 B2
(45) Date of Patent: Apr. 23, 2019

(54) METHOD FOR OPERATING A WIND FARM

(71) Applicant: WOBBEN PROPERTIES GMBH, Aurich (DE)

(72) Inventor: Alfred Beekmann, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/545,235

(22) PCT Filed: Jan. 26, 2016

(86) PCT No.: PCT/EP2016/051550
§ 371 (c)(1),
(2) Date: Jul. 20, 2017

(87) PCT Pub. No.: WO2016/120260
PCT Pub. Date: Aug. 4, 2016

(65) Prior Publication Data
US 2017/0373533 A1     Dec. 28, 2017

(30) Foreign Application Priority Data
Jan. 28, 2015   (DE) ................ 10 2015 201 431

(51) Int. Cl.
*F03D 7/02* (2006.01)
*F03D 7/04* (2006.01)
(Continued)

(52) U.S. Cl.
CPC .............. *H02J 11/00* (2013.01); *F03D 7/026* (2013.01); *F03D 7/0224* (2013.01);
(Continued)

(58) Field of Classification Search
USPC ...................................... 290/44, 55
See application file for complete search history.

(56) References Cited

U.S. PATENT DOCUMENTS 7,352,076 B1 * 4/2008 Gabrys ................. F03D 3/005
                                                                290/44
8,108,079 B2   1/2012 Wobben
(Continued)

FOREIGN PATENT DOCUMENTS

| CN | 103080538 A | 5/2013 |
|---|---|---|
| CN | 103140670 A | 6/2013 |

(Continued)

*Primary Examiner* — Pedro J Cuevas
(74) *Attorney, Agent, or Firm* — Seed IP Law Group LLP (57) ABSTRACT

A method for operating a plurality of wind energy installations configured for supplying electric power to an electrical supply system, that each have an aerodynamic rotor with rotor blades and an electrical generator and also operating equipment, is disclosed. The wind energy installations are operated while they are not connected to the electrical supply system, where at least one of the wind energy installations produces electric power and inputs the electric power into a local DC voltage system that connects the wind energy installations if the at least one of the wind energy installations currently produces more power than needed for supplying its own operating equipment. Additionally or alternatively, the operating equipment is supplied totally or in part with power from the local DC voltage system if the at least one of the wind energy installations currently produces less power than needed for supplying its operating equipment.

21 Claims, 6 Drawing Sheets

(51) Int. Cl.
*F03D 9/11* (2016.01)
*H02J 3/32* (2006.01)
*H02K 7/18* (2006.01)
*H02P 101/15* (2016.01)
*F03D 9/12* (2016.01)
*F03D 9/22* (2016.01)
*F03D 9/25* (2016.01)
*H02P 9/02* (2006.01)
*H02J 11/00* (2006.01)

(52) U.S. Cl.
CPC ......... *F03D 7/0268* (2013.01); *F03D 7/0276* (2013.01); *F03D 7/048* (2013.01); *F03D 9/11* (2016.05); *F03D 9/12* (2016.05); *F03D 9/22* (2016.05); *F03D 9/257* (2017.02); *H02J 3/32* (2013.01); *H02K 7/183* (2013.01); *H02P 9/02* (2013.01); *F05B 2260/20* (2013.01); *F05B 2260/42* (2013.01); *F05B 2260/421* (2013.01); *F05B 2260/85* (2013.01); *F05B 2260/95* (2013.01); *F05B 2270/111* (2013.01); *F05B 2270/32* (2013.01); *F05B 2270/323* (2013.01); *F05B 2270/337* (2013.01); *H02P 2101/15* (2015.01); *Y02E 10/723* (2013.01); *Y02P 90/50* (2015.11); *Y02T 50/675* (2013.01)

(56) References Cited

U.S. PATENT DOCUMENTS

| | | | |
|---|---|---|---|
| 8,183,707 B2 | 5/2012 | Siebers et al. | |
| 8,416,052 B2* | 4/2013 | MacLennan | H01F 27/255 336/233 |
| 8,624,702 B2* | 1/2014 | MacLennan | H01F 27/06 336/210 |
| 8,902,035 B2* | 12/2014 | MacLennan | H01F 27/255 336/67 |
| 9,217,418 B2 | 12/2015 | Bodewes et al. | |
| 9,429,142 B2* | 8/2016 | Yu | H02M 1/36 |
| 9,997,922 B2* | 6/2018 | Beekmann | H02J 3/386 |
| 10,027,266 B2* | 7/2018 | Beekmann | F03D 7/0276 |
| 10,063,060 B2* | 8/2018 | Beekmann | F03D 7/048 |
| 2008/0224670 A1 | 9/2008 | Liu et al. | |
| 2009/0108582 A1 | 4/2009 | Seibers et al. | |
| 2009/0230689 A1 | 9/2009 | Burra et al. | |
| 2009/0283128 A1* | 11/2009 | Zhang | H02J 3/383 136/244 |
| 2011/0227670 A1* | 9/2011 | MacLennan | H01F 27/255 333/185 |
| 2012/0075048 A1* | 3/2012 | MacLennan | H01F 27/06 336/60 |
| 2012/0139680 A1* | 6/2012 | MacLennan | H01F 27/255 336/58 |
| 2013/0106108 A1 | 5/2013 | De Boer et al. | |
| 2013/0175801 A1 | 7/2013 | Matzen | |
| 2013/0184884 A1 | 7/2013 | More et al. | |
| 2013/0197704 A1 | 8/2013 | Pan et al. | |
| 2015/0124496 A1* | 5/2015 | Yu | H02M 1/36 363/35 |
| 2016/0032891 A1 | 2/2016 | Busker et al. | |
| 2016/0294274 A1* | 10/2016 | Wennerstrom | H02M 1/126 |
| 2016/0329714 A1* | 11/2016 | Li | H02M 7/44 |
| 2016/0336888 A1 | 11/2016 | Busker | |
| 2017/0012551 A1* | 1/2017 | Kondo | H02M 5/458 |
| 2018/0283981 A1* | 10/2018 | Brenner | F03D 17/00 |
| 2018/0335014 A1* | 11/2018 | Achenbach | F03D 7/026 |

FOREIGN PATENT DOCUMENTS

| | | |
|---|---|---|
| CN | 105074203 A | 11/2015 |
| CN | 105917542 A | 8/2016 |
| DE | 10 2011 122 433 A1 | 6/2013 |
| EP | 2 056 210 A2 | 5/2009 |
| EP | 2 236 821 A1 | 10/2010 |
| EP | 2 397 688 A1 | 12/2011 |
| JP | S59-176473 A | 10/1984 |
| WO | 2009/082326 A1 | 7/2009 |

* cited by examiner

METHOD FOR OPERATING A WIND FARM

BACKGROUND

Technical Field

The present invention relates to a method for operating multiple wind turbines, in particular a method for operating a wind farm. The present invention also relates to a collection of multiple wind turbines, in particular a wind farm. The present invention also relates to a wind turbine and to a method for operating a wind turbine.

Description of the Related Art

Wind turbines are known; they generate electrical energy from wind and feed it into an electrical supply grid. Some of the energy they need themselves for operating their operating devices. This includes, partly also depending on the type of wind turbine, operating yaw drives for directing the wind turbine into the wind, operating pitch drives for changing an angle of attack of the rotor blades in relation to the wind, supplying the generator with exciting power and also operating heating devices, such as for example for heating the rotor blades, and also electrically supplying the control devices of the wind turbine.

As soon as a wind turbine is in normal operation and is generating electrical power and feeding it into an electrical supply grid, it generates sufficient electrical power to be able to use it to carry out the described supply to itself and also still be able to feed electrical power into the grid. If the wind turbine is unable to generate sufficient power for this, in particular whenever there is insufficient wind, the wind turbine is usually switched off. Then it needs virtually no more power for its own operation. At most, there may then still be a small power requirement, needed for example for operating approach lighting and for a standby mode.

However, resuming the operation of such a wind turbine may be particularly problematical if it needs electrical power from the electrical supply grid. This is so because drawing such electrical power from the grid can sometimes be very costly.

U.S. Pat. No. 8,108,079 is already concerned with this subject. The document makes several suggestions as to how to achieve a power supply particularly when restarting a wind farm. Some questions are left open, however, such as for example, what to do in light wind.

A further problem may arise if wind turbines are not operated particularly when the wind is too light for a sustained period of time and they may suffer as a result due to such a situation of being at a standstill. Such a problem may also occur if there is no connection to the electrical supply grid, at least for a time. This may also be the case, for example, whenever the connection has been terminated because of a fault in the supply grid, in particular a power outage. Such a disconnection prevents normal operation of the wind turbines and may lead to undesired downtimes. In other words, here too there is the risk of the turbine falling into disrepair.

The German Patent and Trademark Office has searched the following prior art in the priority application relating to the present application: U.S. Pat. No. 8,108,079 B2, U.S. 2009/0230689 A1, U.S. 2013/0184884 A1 and WO 2009/082326 A1.

BRIEF SUMMARY

Provided is a solution to the matter of supplying energy to multiple wind turbines is to be proposed, in particular to supplement or improve what the cited U.S. Pat. No. 8,108,079 proposes. At least, an alternative solution to what is known so far is to be provided.

Figure 5:
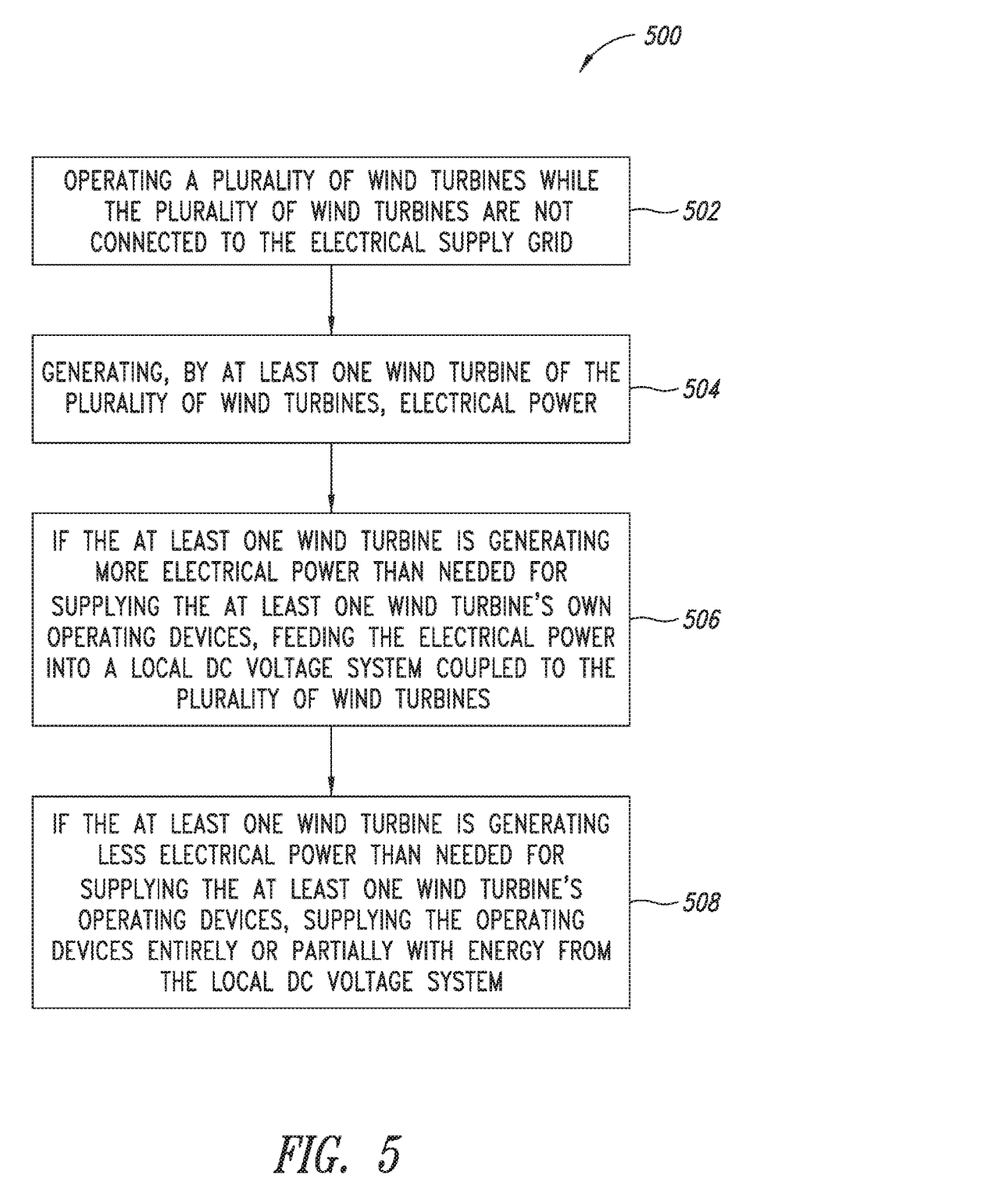
FIG. 5 shows a method for operating a wind turbine.

Provided is a method for operating multiple wind turbines, respectively having an aerodynamic rotor with rotor blades and an electrical generator and also operating devices, prepared for feeding electrical power into an electrical supply grid, the wind turbines also being operated while they are not connected to the electrical supply grid (at 502 in FIG. 5), and at least one of the wind turbines generating electrical power (at 504) and feeding it into a local DC voltage system connecting the wind turbines if it is currently generating more power than it currently needs for supplying its own operating devices (at 506), and/or its operating devices being supplied entirely or partially with energy from the local DC voltage system if it is currently generating less power than it currently needs for supplying its own operating devices (at 508).

This method is, therefore, based on at least two wind turbines that are connected by a local DC voltage system. To this extent, the method also relates in particular to operating a wind farm. In principle, the method may, however, also go beyond that. This is so because it also comprises the possibility that the multiple wind turbines are connected by way of the local DC voltage system without otherwise forming a wind farm. The method may also relate to the operation of multiple wind turbines of a wind farm that are connected by way of the said local DC voltage system without all of the wind turbines of the wind farm being connected to this local DC voltage system. Preferably, however, the method relates to the operation of a wind farm.

The method is therefore based on the case where the wind turbines are operated even while they are not connected to the electrical supply grid. The method proceeds from this case and at least one of the wind turbines nevertheless generates electrical power and feeds it into the local DC voltage system if at that moment it is currently generating more power than it currently needs for supplying its own operating devices.

Also or alternatively, it is proposed that, for this state of not being in connection with the electrical supply grid, at least one of the wind turbines supplies its operating devices entirely or partially with energy from the local DC voltage system if it is currently generating less power than it currently needs for supplying its own operating devices. This may also mean that it generates part of the energy needed itself and only draws a supplementary part from the local DC voltage system. Consequently, a wind turbine that is generating more than sufficient power will use part for its own supply and feed the rest into the local DC voltage system.

Particularly advantageously, this allows the wind turbines to support one another, in that one wind turbine can use surplus power or energy of the other wind turbine. Such coupling is achieved by way of a DC voltage system.

It has particularly been recognized that such a way of the wind turbines supplying one another can be achieved particularly well by a DC voltage system. This includes that it is not necessary to pay attention to synchronization of the frequency, including ensuring a phase position. Particularly, many wind turbines, which have a frequency inverter for feeding into the supply grid and/or for activating the generator, have at least one DC link or other internal DC circuit. In addition, the use of this local DC voltage system allows a good separation to be achieved from the electrical feeding into the electrical supply grid operated with alternating current.

Using a battery or other energy store is particularly advantageous realizable by DC voltage, even if the energy store is operated with DC voltage. This can also be achieved by the proposed use of the local DC voltage system.

Other advantages emerge in the text that follows in connection with further embodiments.

The method is preferably distinguished by the fact that the wind turbines are also operated, in particular not switched off, when, because of the prevailing wind conditions, they are able to generate less power than they need for operating their operating devices. This applies in particular to the case of light wind, but also to other cases; for instance in some cases faults may be a reason. In this case it is proposed to operate the wind turbines nevertheless, with the consequence that they need additional energy to make this operation possible. Sometimes, such operation may, however, also be of a short duration, if, for example, stronger wind is expected shortly. In any event, however, such proposed operation can be used to counteract the described risk of the turbine falling into disrepair. This is achieved by the additionally needed energy or power being provided by the local DC voltage system. In other words, the energy or power can be provided comparatively unproblematically.

The energy needed here may be provided, for example, by another turbine, which, for example, by virtue of its type or as a result of a more favorable position at that moment in relation to the wind, is able to generate surplus energy or power. Preferably, however, it is provided that an energy store is provided in the local DC voltage system and at least one wind turbine uses energy from the energy store in order to supply its operating devices with it entirely or partially. If appropriate, it is also possible here for all of the wind turbines to supply their operating devices entirely or partially with energy from the energy store.

Such an energy store, which may be formed as a battery, can be supplied with energy at times at which more energy is correspondingly available, in particular when there is correspondingly strong wind. Particularly, whenever more power is generated by the wind turbines than they need themselves, while they are disconnected from the grid, this surplus power or energy is used for charging the energy store. Charging of the energy store may also be advantageous whenever the turbines are connected to the grid; rated power can be generated and, on the basis of a stipulation by the operator of the grid, reduced however in the amount of this power that is fed into the grid.

The energy stores may consequently take the form of banks of batteries, which may be referred to simply as batteries, or else, for example, energy stores that convert the electrical energy into another form of energy for storage, such as, for example, hydrogen or natural gas, in particular methane.

According to one embodiment, it is proposed that at least one of the wind turbines is prepared for being operated in an idling mode, in which the rotor blades are adjusted at a starting angle in relation to the wind at which the rotor can start up well in light wind, the respective wind turbine continuing to be operated with the starting angle after starting up if it is able to generate less power than it needs for operating its operating devices because of the prevailing wind conditions.

An idling operating mode is such a mode in which the aerodynamic rotor driven by the wind rotates slowly and with little force. Correspondingly, little or no power is generated. In this case, a starting angle that is suited particularly well for starting the wind turbine, and can in particular characterize the idling operating mode, is set. The starting angle is, therefore, intended for the situation in which the aerodynamic rotor is stationary and the wind turbine is directed into the wind in its yawing position. If light wind then acts on the aerodynamic rotor set in this way, a breakaway torque is particularly required in order for the aerodynamic rotor to begin rotating. As soon as the aerodynamic rotor is rotating, the incident flow conditions at the rotor blade change, because the incident flow angle is vector-wise made up of the wind direction with the wind speed and the incident flow along with the direction that results from the movement of the rotor blade. The consequently actual or effective incident flow angle consequently changes significantly once the aerodynamic rotor has begun to rotate. Nevertheless, according to one embodiment, it is proposed to leave the starting angle unchanged, or at least not to change it to a customary angle of the part-load operating mode. This achieves the effect that the aerodynamic rotor rotates, but with low speed and force. This particularly achieves the effect that a standstill of the aerodynamic rotor is avoided. It is at the same time possible to generate low power, which can be used for operating the operating devices of the respective wind turbine. Further power, needed for operating the operating devices, may be taken from the local DC voltage system.

It is thus now proposed to operate the at least one wind turbine even when it is unable to feed any power into the electrical supply grid. Using the starting angle means that, although not much power can be generated, in return using, and in particular retaining, the starting angle achieves the effect that the wind turbine does not remain stationary, as long as the wind does not drop again. Consequently, a small but quite reliable rotation of the aerodynamic rotor is achieved by this proposal. A high energy yield is not important, and any further operational energy that is needed can be provided by the local DC voltage system.

It is particularly advantageous if the starting angle lies between an angle in the feathered position, in which the rotor blades are turned completely out of the wind, and a part-load angle or medium part-load angle for a part-load operating mode, in which the rotor blades have an optimum angle, in particular if the starting angle is approximately 20-40°, in particular approximately 30°, less than the angle of the feathered position, and/or approximately 40-60°, in particular approximately 50°, greater than the part-load angle or medium part-load angle for the part-load operating mode.

Consequently, a starting angle in the range between a part-load angle and the feathered position is particularly advantageously chosen. In the feathered position, the wind turbine would be just as unlikely to begin rotating as at the part-load angle, and consequently an angle that lies between these two extreme positions and also differs significantly from these two extreme positions, in particular by at least 10°, is chosen as the starting angle.

The local DC voltage system preferably has a medium voltage, which lies in particular in the range from 1200 V-5 kV. Also or alternatively, at least one of the wind turbines has an inverter with a DC link with a link voltage and the link voltage has approximately the voltage level of the local DC voltage system. Also or alternatively, the local DC voltage system is coupled with the DC link. Particularly when there is a direct coupling between the DC link and the local DC voltage system, a voltage of approximately 700 V is provided for both. Consequently, a simple coupling possibility is obtained with this direct coupling between the DC link and the local DC voltage system. With the use of a voltage of 1200 V-5 kV, a coupling to a DC link that may have a step-up converter for feeding power into the local DC voltage system or a step-down converter for taking power may also be provided. Such components can also be produced and used comparatively easily and at low cost.

According to one embodiment, it is proposed that a cut-in speed, at which the generator is switched on for generating electrical power, is set to a low value such that less power is generated than is used by the operating devices of the wind turbine concerned to operate it with this wind. This embodiment consequently also serves the purpose of redeploying operation of the wind turbine for its own protection. From an energy perspective, this embodiment is not advantageous, but it serves for preventing damage to the wind turbine due to long downtimes.

According to an advantageous refinement, it is proposed that an electrical voltage is kept as constant as possible in the local DC voltage system by regulating the voltage, and a storage device, in particular a flywheel, preferably being coupled with the local DC voltage system and used for briefly delivering or receiving electrical power to or from the local turbine system in order to carry out or assist the regulating of the voltage.

Regulating the voltage of the local DC voltage system particularly allows a constant and reliable situation to be created in each case, particularly, from the viewpoint of each wind turbine. One possible way of a voltage drop occurring may be that suddenly a greater amount of electrical power is taken, and a sudden voltage increase could be caused by a sudden increase in the power fed in. Accordingly, one point of the voltage control is to buffer power or energy respectively for a short period of time.

The operating devices of at least one of the wind turbines are preferably operated such that they generate heat for drying or keeping dry the wind turbine or part thereof. It is consequently proposed to design the operation of the wind turbines particularly for the purpose of protecting them from falling into disrepair. Apart from an at least slow rotation of the aerodynamic rotor and also of the rotor of the generator in order to prevent damage due to downtimes, the avoidance of moisture, in particular condensation, also protects the turbine. This may be achieved particularly by heating the turbine or part thereof. To this extent, it is proposed to generate at least as much power even when it cannot be fed into the grid. In this case, the generator and electronic devices of the wind turbine are in particular such parts that should be kept dry. Among the electronic devices that should be kept dry are particularly the control device, a rectifier unit and an inverter, including a step-up converter, if provided.

Provided is wind farm comprising along with wind turbines a local DC voltage system, which connects the wind turbines and is prepared for receiving power from at least one of the wind turbines in order to buffer store it and/or provide it to one of the wind turbines for operating the operating devices of this at least one wind turbine. Such a wind farm preferably has in the local DC voltage system an energy store for storing electrical energy. Such a wind farm is particularly prepared for being operated by a method according to at least one of the embodiments explained above. Correspondingly, the wind farm is designed for operation according to such a method and has the corresponding technical means for implementation.

Also proposed is a wind turbine which is prepared for being arranged and operated in a wind farm according to at least one of the embodiments explained above. In particular, such a wind turbine has a connecting means for connecting to the local DC voltage system.

Figure 6:
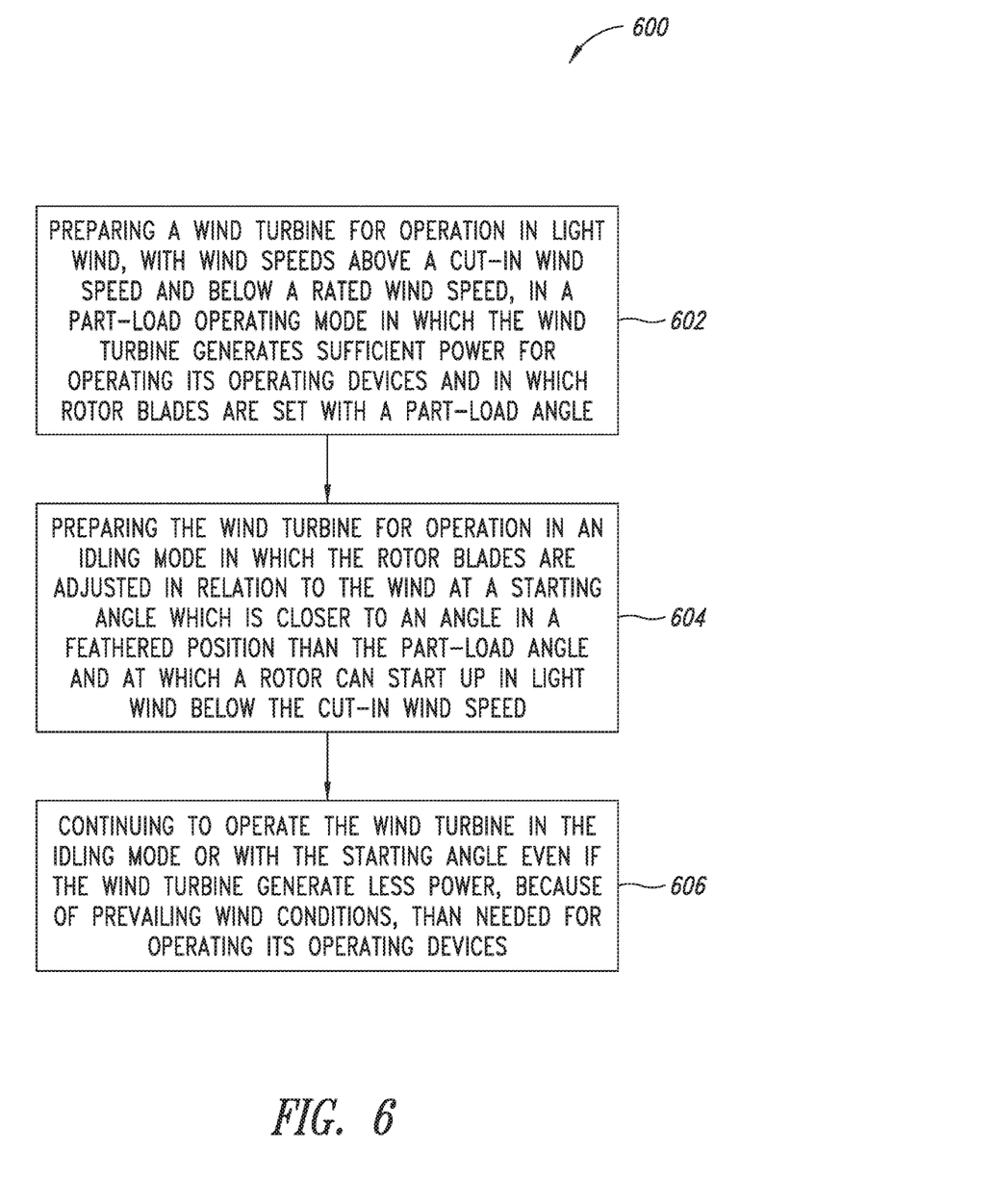
FIG. 6 shows a method for operating a wind turbine.

Provided is a method for operating a wind turbine comprising a rotor with adjustable rotor blades is proposed, the wind turbine (at 602 in FIG. 6) being prepared for being operated in light wind, with wind speeds above a cut-in wind speed and below a rated wind speed, in a part-load operating mode, in which the wind turbine generates sufficient power for operating its operating devices and in which the rotor blades are set with a part-load angle, and the wind turbine (at 604) being prepared for being operated in an idling mode, in which the rotor blades are adjusted in relation to the wind at a starting angle, which is closer to an angle in the feathered position than the part-load angle, and at which the rotor can start up well in light wind, in particular in light wind still below the cut-in wind speed, and the respective wind turbine (at 606) continuing to be operated in the idling mode if it is able to generate less power than it needs for operating its operating devices because of the prevailing wind conditions. The wind turbine is accordingly operated in a range below part-load operation, that is before there is sufficient wind for normal operation.

The wind turbine on which this method is based can also be operated in an idling mode. The idling operating mode is understood here as meaning a mode in which the rotor blades are adjusted at a starting angle in relation to the wind. This starting angle is one that lies in a range between a part-load angle and an angle in the feathered position. In particular this starting angle is selected, as described according to at least one of the aforementioned embodiments.

With this starting angle, the wind turbine is capable of starting up with little wind, that is to say so little wind that the turbine would not be operated in the customary part-load operating mode. The starting angle is consequently a setting in which the aerodynamic rotor at a standstill still receives enough torque from very light wind that it can overcome a breakaway torque. This is still possible even in such light wind that is unable to provide enough energy to supply the operating devices of the wind turbine. It is nevertheless proposed to continue operating the wind turbine in this idling mode while retaining the starting angle, or a similar angle. This particularly achieves the effect that the wind turbine that is operated in this way is protected from falling into disrepair due to being at a standstill.

The wind turbine is preferably permanently operated in the idling mode, with no power being generated. This may be advantageous particularly for any bearings, if as a result the wind turbine can be kept in constant motion. A very slow motion may be sufficient for this.

According to one embodiment, it is proposed that an atmospheric humidity of the surroundings of the wind turbine is recorded, and the wind turbine is operated for an idling time in the idling mode; after the elapse of a waiting time that is greater than the idling time, operation in the idling mode is repeated if the wind turbine still is able to generate less power than it needs for operating its operating devices because of the prevailing wind conditions, and the waiting time and/or the idling time is/are set in dependence on the recorded atmospheric humidity, in particular such that the idling time is chosen to be greater, the higher the recorded atmospheric humidity and/or the waiting time is chosen to be lower, the higher the recorded atmospheric humidity.

This allows an idling operating mode to be carried out for a particularly long time or particularly often when there is high atmospheric humidity, and thereby particularly allows protection from corrosion to be improved. At the same time, the idling operating mode may be reduced when there is low atmospheric humidity, in order, in this way also, to keep the corresponding expenditure for operating the idling mode low.

Provided is a wind turbine has a rotor with adjustable rotor blades and is operated by a method explained above according to at least one embodiment. Correspondingly, a wind turbine that can be effectively protected from falling into disrepair, even in the case of very little wind, is proposed. Also for such a wind turbine and methods described above, it is advantageous to provide power or energy for operating the wind turbine by a local DC voltage system if it currently cannot be taken from the wind.

An explained idling operating mode, in which the wind turbine is unable to generate sufficient power for supplying itself, preferably includes operation in which this self-supply is only not ensured for a period of time. This may be particularly a period of time during the start-up of the wind turbine or a period of time that temporarily needs additional power, such as, for example, for heating the rotor blades or for pitching the rotor blades. In other words, an idling operating mode in which the wind turbine is unable to supply itself also includes such operation that includes time periods in which the wind turbine can supply itself, because temporarily less power is needed, when a prior or subsequent temporary period of time needs more power than the wind turbine itself is able to generate.

Preferably, in an idling operating mode no power is generated and, in particular, the generator is not activated for generating electrical power from wind in this idling operating mode. This may mean, in particular, that, when an externally excited synchronous generator is used, the external excitation is not activated or not performed.

It is consequently also proposed according to one embodiment to operate the wind turbine in an idling mode in which the generator is not activated and the wind turbine to this extent is not fully operated but is only kept in motion.

BRIEF DESCRIPTION OF THE SEVERAL VIEWS OF THE DRAWINGS

The invention is explained more precisely below by way of example on the basis of exemplary embodiments with reference to the accompanying figures.

DETAILED DESCRIPTION

Figure 1:
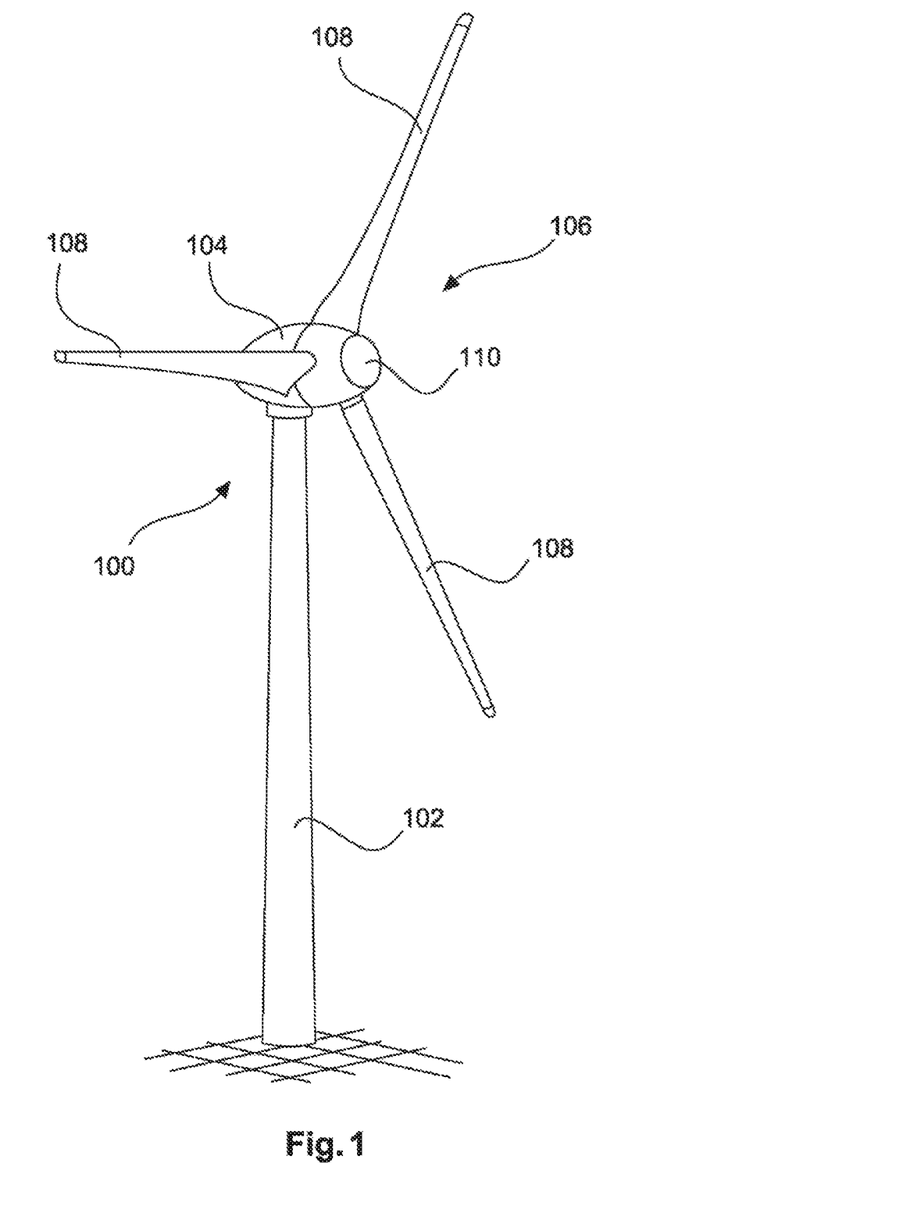
FIG. 1 schematically shows a wind turbine in a perspective view.

FIG. 1 shows a wind turbine 100 comprising a tower 102 and a nacelle 104. Arranged on the nacelle 104 is a rotor 106 with three rotor blades 108 and a spinner 110. During operation, the rotor 106 is set in a rotating motion by the wind and thereby drives a generator in the nacelle 104.

Figure 2:
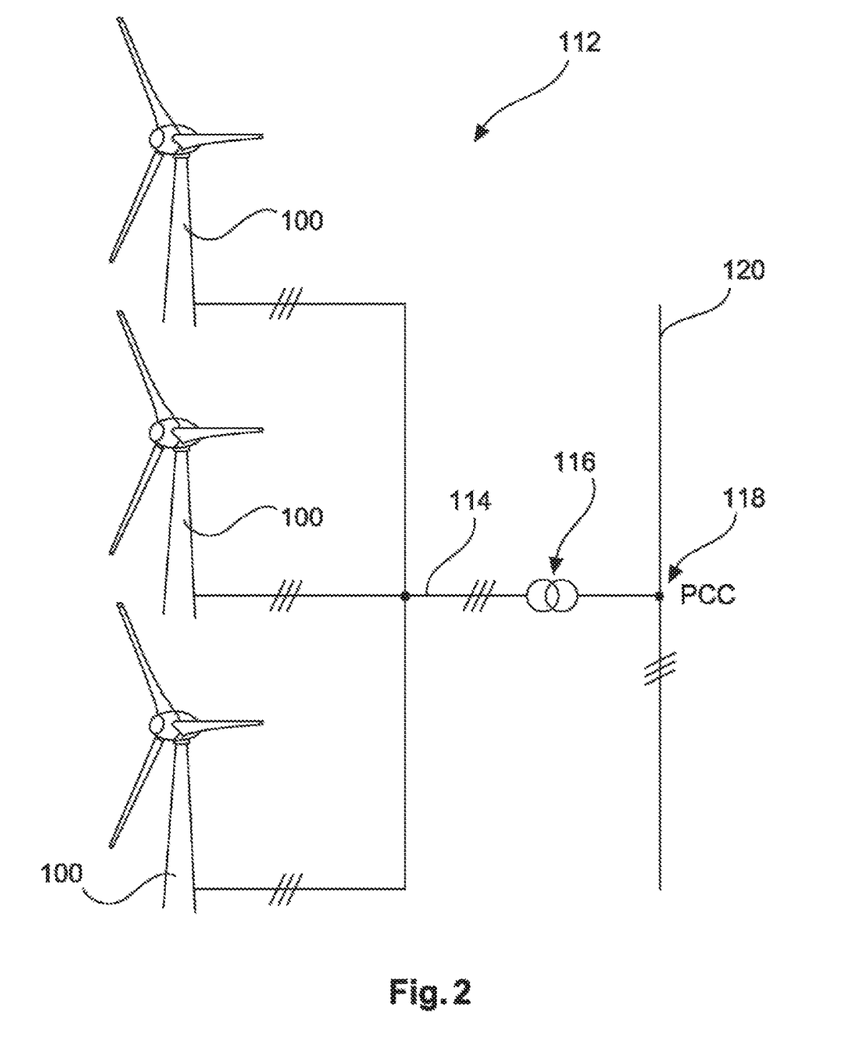
FIG. 2 schematically shows a wind farm.

FIG. 2 shows a wind farm 112 comprising by way of example three wind turbines 100, which may be identical or different. The three wind turbines 100 are consequently representative of in principle any number of wind turbines of a wind farm 112. The wind turbines 100 provide their power, that is in particular the electricity generated, by way of an electrical farm system 114. In this case, the respectively generated electricity or power of the individual wind turbines 100 is added together and there is usually a transformer 116, which steps up the voltage in the farm to then feed it into the supply grid 120 at the feeding-in point 118, which is also generally referred to as the PCC. FIG. 2 is only a simplified representation of a wind farm 112, which for example does not show any control system, although of course there is a control system. Also, for example, the farm system 114 may be differently designed, in that, for example, there is also a transformer at the output of each wind turbine 100 to mention one other exemplary embodiment.

Figure 3:
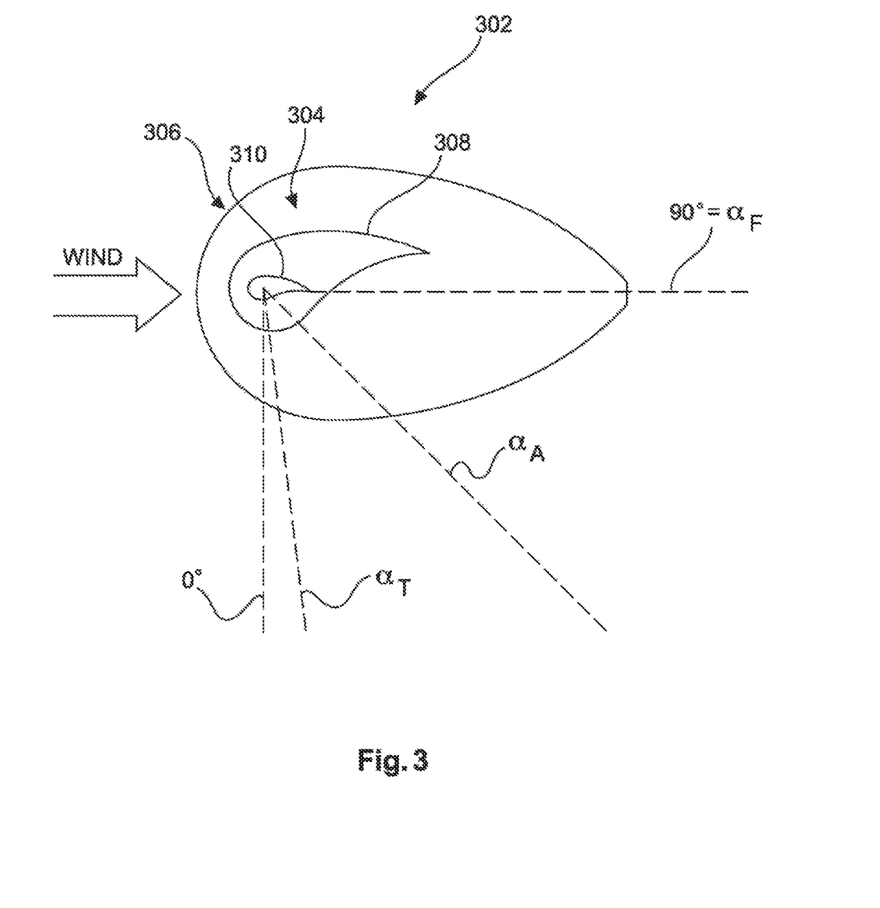
FIG. 3 illustrates blade positions of a wind turbine.

FIG. 3 schematically shows in a plan view a wind turbine nacelle 302 with a rotor blade 304. Two further rotor blades of a customary wind turbine are not shown in this FIG. 3 for the sake of simplicity.

This nacelle 302 has been directed into the wind and the rotor blade 304 is approximately in the feathered position. The rotor blade 304 is arranged on the hub 306 and is slightly twisted in its longitudinal direction. In order to show that, a portion 308 near the hub and a portion 310 away from the hub of the rotor blade 304 are schematically shown in this plan view. Particularly toward the portion 310 away from the hub, the rotor blade 304 is directed approximately parallel to the wind. This feathered position is represented in FIG. 3 by a dashed line parallel to the wind. It is identified by $90°=\alpha_F$. It consequently has an angle of 90°. This angle of 90° relates to a plane of the rotor that the rotor blade 304 passes over during its rotation. This plane correspondingly has the value 0°, which is likewise depicted in FIG. 3.

FIG. 3 also shows an angle $\alpha_T$, which indicates the angle that the rotor blade 304 assumes in the part-load operating mode. This angle is approximately 6° and correspondingly the rotor blade 304 would have to turn by approximately 84° from the feathered position shown in order to assume this part-load position.

Also depicted in FIG. 3 is a position for a starting angle $\alpha_A$, which is approximately 45°, just to provide an example. This alignment consequently lies approximately midway between a feathered position with the angle $\alpha_F$ on the one hand and the part-load operating mode with a part-load angle $\alpha_T$ on the other hand.

So if the rotor blade 304 turns into the position with the starting angle $\alpha_A$, the rotor blade 304 offers the wind a good attacking position and the rotor blade 304 or the hub 306 can then begin rotating from a stopped position even in very light wind. In particular, a breakaway torque that would be needed here can be exceeded. As soon as the rotor with the rotor blade 304 and the hub 306 begins to rotate, the actual wind conditions at each rotor blade 304 change due to the movement of the rotor blades 304. The depicted starting angle $\alpha_A$ is then no longer optimal, but it is nevertheless preferably proposed to retain this starting angle in order to realize an idling operating mode particularly for a relatively long time.

Figure 4:
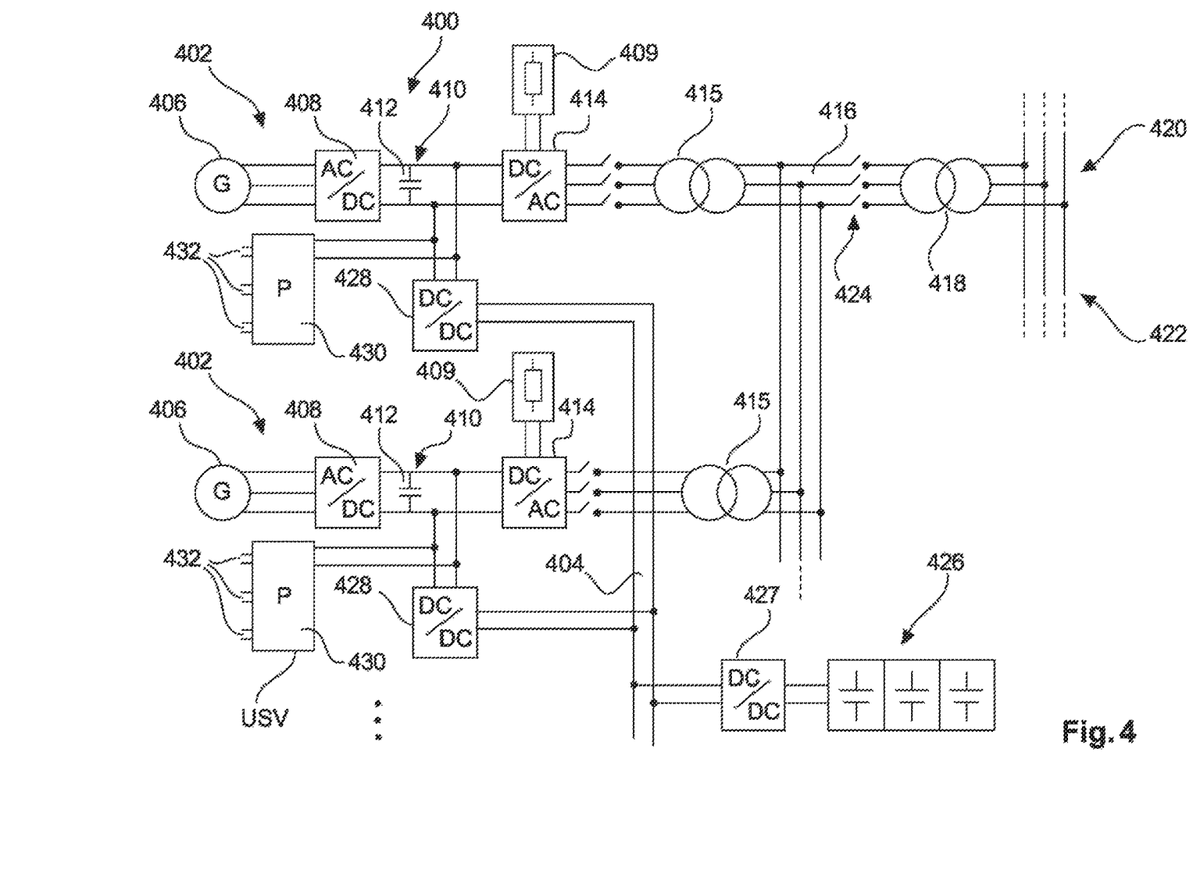
FIG. 4 schematically shows electrical connections in a wind farm.

FIG. 4 schematically shows a wind farm 400 comprising two wind turbines 402, which may be representative of various other wind turbines.

The wind turbines 402 are schematically represented to the extent that only some of their essential electrical elements are represented, in order particularly also to illustrate the interrelationships with the local DC voltage system 404.

According to the representation of FIG. 4, each wind turbine 402 has a generator 406, which is driven by an aerodynamic rotor (not represented), in order thereby to generate electrical power. This electrical power is three-phase, that is to say it is in particular generated as alternating current and rectified with a rectifier 408. The resultant direct current is passed to the DC link 410. The DC link has in this case a DC link capacitor 412. This can serve as an electrical intermediate store or buffer. At the DC link of each inverter 414, a chopper 409 may be provided in each case for carrying away power by way of resistors, in particular in order in this way to control the voltage in the DC link.

Then the inverter 414 generates from the DC link 410 an alternating current, which is fed into an electrical supply grid 422 by way of an AC farm system 416 and for example a transformer 418 at a grid feed-in point 420. A disconnection from the grid, which is required, for example, in the event of a fault, can be achieved by a disconnector 424. On the output side of the inverters 414, transformers 415 that can if appropriate be respectively disconnected by a disconnector 417 may be provided.

To this extent, a wind farm 400 comprising wind turbines 402 can be operated by the elements described, that is to say a generator 406, rectifier 408, DC link 410 and inverter 414 for feeding electrical power into the supply grid 422.

It is thus proposed to additionally provide the local DC voltage system 404 shown, in order to make it possible for the wind turbines 402 to supply power to one another. Furthermore, this local DC voltage system 404 also provides an electrical storage device 426, which is formed and illustrated here as a bank of batteries. Further, identical, similar or different storage devices may also be provided. For the coupling, a DC-DC converter 427 may be provided in the case of each storage device 426, in order to adapt the voltage of the local direct voltage in the DC voltage system 404 to the voltage at the respective storage device 426, in particular at its connection terminals.

This local DC voltage system 404 can thus be coupled by way of so-called DC-DC converters 428 to the respective DC link 410. This DC-DC converter operates bidirectionally, so that it can pass electrical power from the respective DC link 410 into the local DC voltage system 404, or can take electrical power from the local DC voltage system 404 and supply it to the DC link.

This DC-DC converter can consequently be used in principle as a control means for delivering or receiving electrical power. At the same time, it may however also provide a voltage increase for feeding into the local DC voltage system 404 or a voltage reduction when electrical power is taken from the local DC voltage system 404, if it has a correspondingly higher voltage in comparison with the DC link 410. The DC-DC converter could also be realized by two elements, that is to say one each for the described functions or effective directions.

It is consequently evident that the use of this local DC voltage system makes it possible in an easy way to exchange electrical power between the wind turbines 402 and at the same time makes it possible in an easy way to take power from the electrical storage device 426 or else also feed it in there.

This local DC voltage system 404 and in particular also the DC-DC converters are particularly intended to exchange electrical power between the wind turbines 402 and the electrical storage device 426 for supplying electrical operating devices of the corresponding wind turbines 402. Shown to illustrate this is a symbolic power cabinet 430, which can be supplied with electrical power by way of the DC link 410. Likewise for symbolic purposes, this power cabinet 430 has several power outputs 432. This is intended to illustrate that operating devices, such as, for example, drives for adjusting the rotor blades, heaters of the rotor blades or the supply of appropriate power to an externally excited DC generator, can be supplied from this power cabinet 430, or from another device for providing power. This power cabinet 430 should be understood particularly as being a representative device, and operating devices may also be connected in some other way to the DC link 410 or for example to the DC-DC converter 428. In the power cabinet there is preferably an uninterruptible power system (USV).

The two wind turbines 402 that are explained by way of example have also been provided with the same designations in the explanation of the internal elements. This serves in particular for better explanation, and in fact the two wind turbines 402 that are represented by way of example may also be identical in reality. However, different wind turbines or wind turbines with similar properties but different means in detail may also be used. In any event, the use of the same designations for each of the two wind turbines 402 is not intended to constitute any substantive restriction.

The invention claimed is:

1. A method for operating a plurality of wind turbines, respectively having an aerodynamic rotor with rotor blades, an electrical generator and operating devices, for feeding electrical power into an electrical supply grid, the method comprising:
    operating the plurality of wind turbines while the plurality of wind turbines are not connected to the electrical supply grid;
    generating, by at least one wind turbine of the plurality of wind turbines, electrical power;
    in the event, the at least one wind turbine is generating more electrical power than needed for supplying the at least one wind turbine's own operating devices, feeding the electrical power into a local DC voltage system coupled to the plurality of wind turbines; and
    in the event, the at least one wind turbine is generating less electrical power than needed for supplying the at least one wind turbine's operating devices, supplying the operating devices entirely or partially with energy from the local DC voltage system.

2. The method according to claim 1, further comprising:
    refraining from switching off the plurality of wind turbines when, due to prevailing wind conditions, the plurality of wind turbines only generate less power than needed for operating the plurality of wind turbines' respective operating devices.

3. The method according to claim 1, wherein:
    an energy store is provided in the local DC voltage system; and
    a wind turbine of the plurality of wind turbines uses energy from the energy store to entirely or partially supply operating devices of the wind turbine.

4. The method according to claim 1, further comprising:
    preparing the at least one wind turbine for operation in idling mode by adjusting the rotor blades to a starting angle in relation to wind, the starting angle being an angle of attack at which the rotor rotates in light wind; and
    continuing to operate the at least one wind turbine with the starting angle after start up if the at least one wind turbine generates less power than needed for operating devices of the at least one wind turbine because of prevailing wind conditions.

5. The method according to claim 4, wherein the starting angle lies between an angle of a feathered position, at which the rotor blades are turned completely out of the wind, and at least one of a part-load angle and a medium part-load angle for a part-load operating mode, at which the rotor blades have an optimum angle.

6. The method according to claim 5, wherein the starting angle is 20-40° less than the angle of the feathered position and 40-60° greater than at least one of the part-load angle and the medium part-load angle.

7. The method according to claim 6, wherein the starting angle is 30° less than the angle of the feathered position and 50° greater than at least one of the part-load angle and the medium part-load angle.

8. The method according to claim 1, wherein the local DC voltage system has a voltage of 1200 V-5 kV, and the at least one wind turbine has an inverter with a DC link having a link voltage, and wherein the voltage of the local DC voltage system is at least twice as much as the link voltage and wherein the local DC voltage system is coupled to the DC link.

9. The method according to claim 8, wherein the link voltage is 700 V.

10. The method according to claim 1, further comprising:
setting a cut-in wind speed, at which the generator is switched on for generating the electrical power, to a value such that less power is generated by the generator than is used by the operating devices for operating the at least one wind turbine with wind.

11. The method according to claim 1, further comprising:
regulating a voltage of the local DC voltage system to keep the voltage relatively constant by using a storage device coupled to the local DC voltage system for delivering or receiving electrical power to or from the local DC voltage system.

12. The method according to claim 11, wherein the storage device is a flywheel.

13. The method according to claim 1, further comprising:
generating, by the operating devices, heat for drying the at least one wind turbine.

14. A wind farm comprising:
a plurality of wind turbines configured to generate respective power, each of the wind turbines including operating devices; and
a local DC voltage system coupled to the plurality of wind turbines and configured to receive the power from at least one of the plurality of wind turbines to buffer store the power and provide the power to the at least one of the wind turbines for operating its operating devices of the at least one of the wind turbines.

15. The wind farm according to claim 14, wherein the local DC voltage system includes an energy store for storing the electrical power.

16. The wind farm according to claim 14, wherein:
the plurality of wind turbines are configured to be operated while the plurality of wind turbines not connected to an electrical supply grid;
in the event at least one wind turbine is generating more power than needed for supplying the at least one wind turbine's own operating devices, the power is fed to the local DC voltage system; and
in the event the at least one wind turbine is generating less power than needed for supplying the at least one wind turbine's operating devices, the operating devices are supplied entirely or partially with power from the local DC voltage system.

17. A wind turbine configured to be arranged and operated in the wind farm according to claim 14.

18. A method for operating a wind turbine including a rotor with adjustable rotor blades, the method comprising:
configuring the wind turbine for operating in light wind, with wind speeds above a cut-in wind speed and below a rated wind speed, in a part-load operating mode, in which the wind turbine generates sufficient power for operating devices of the wind turbine and in which the rotor blades are set with a part-load angle;
configuring the wind turbine for operating in an idling mode, in which the rotor blades are positioned in relation to wind at a starting angle that is closer to a feathered position angle than the part-load angle, and at which the rotor can start up in light wind below the cut-in wind speed; and
continuing to operate the wind turbine in the idling mode and with the starting angle even if the wind turbine, due to prevailing wind conditions, generates less power than needed for operating the operating devices.

19. The method according to claim 18, wherein the wind turbine is permanently operated in the idling mode with no power being generated.

20. The method according to claim 18, further comprising:
recording an atmospheric humidity of surroundings of the wind turbine;
operating the wind turbine for a duration of an idling time in the idling mode;
after a waiting time that is greater than the idling time elapses, repeating operating the wind turbine in the idling mode if, due to the prevailing wind conditions, the wind turbine still generates less power than needed for operating the operating devices, and
setting at least one of the waiting time and the idling time based on the recorded atmospheric humidity, the setting including at least one of:
increasing the idling time as the recorded atmospheric humidity increases; and
decreasing the waiting time as the recorded atmospheric humidity increases.

21. A wind turbine comprising the rotor with the adjustable rotor blades, wherein the wind turbine is operated by the method according to claim 18.

* * * * *